US007617423B2

(12) United States Patent
Patel et al.

(10) Patent No.: US 7,617,423 B2
(45) Date of Patent: Nov. 10, 2009

(54) SYSTEM AND METHOD FOR DETECTING, REPORTING, AND REPAIRING OF SOFTWARE DEFECTS FOR A WIRELESS DEVICE

(75) Inventors: Mehul B. Patel, Bangalore (IN); Anand Agrawal, Bangalore (IN)

(73) Assignee: Kyocera Corporation, Kyoto (JP)

( * ) Notice: Subject to any disclaimer, the term of this patent is extended or adjusted under 35 U.S.C. 154(b) by 389 days.

(21) Appl. No.: 11/464,463

(22) Filed: Aug. 14, 2006

(65) Prior Publication Data

US 2008/0046786 A1 Feb. 21, 2008

(51) Int. Cl.
*G06F 11/00* (2006.01)
(52) U.S. Cl. .......................... 714/55; 714/38; 455/423; 455/425
(58) Field of Classification Search ........................ None
See application file for complete search history.

(56) References Cited

U.S. PATENT DOCUMENTS

| | | | |
|---|---|---|---|
| 5,237,677 A | 8/1993 | Hirosawa et al. | |
| 5,892,898 A | 4/1999 | Fujii et al. | |
| 6,795,703 B2 | 9/2004 | Takae et al. | |
| 6,910,159 B2 * | 6/2005 | Phillips et al. | 714/38 |
| 7,110,757 B2 * | 9/2006 | Herrmann | 455/425 |
| 2001/0049263 A1 * | 12/2001 | Zhang | 455/67.1 |
| 2002/0049053 A1 | 4/2002 | Nomura et al. | |
| 2004/0087303 A1 * | 5/2004 | Pugliese | 455/423 |
| 2006/0211415 A1 * | 9/2006 | Cassett et al. | 455/423 |
| 2006/0211416 A1 * | 9/2006 | Snyder et al. | 455/423 |
| 2006/0277442 A1 * | 12/2006 | Lantz et al. | 714/38 |
| 2007/0243865 A1 * | 10/2007 | Cho | 455/425 |

OTHER PUBLICATIONS

Microsoft Computer Dictionary 4th Ed., Microsoft Press, 1999, p. 187.*

* cited by examiner

*Primary Examiner*—Christopher S McCarthy

(57) ABSTRACT

A system and method for detecting, reporting, and repairing software defects in a wireless device is disclosed. The system has a wireless subscriber unit for communicating to a support server. The wireless subscriber unit maintains an action file indicative of the historical operation of the wireless subscriber unit. When the wireless subscriber unit detects a local defect or error, the action list is transmitted to the support server. The action file is used by support staff to identify and fix the error, and to prepare a repaired software file. The repaired software file is received at the wireless subscriber unit, and the user is notified that the defect has been fixed. Also, the wireless subscriber unit may receive status updates from the central server to inform the user of repair progress.

25 Claims, 4 Drawing Sheets

SYSTEM AND METHOD FOR DETECTING, REPORTING, AND REPAIRING OF SOFTWARE DEFECTS FOR A WIRELESS DEVICE

TECHNICAL FIELD

The present invention relates generally to the field of software repair, and more particularly to detecting, reporting, and repairing defects in a wireless subscriber unit.

DESCRIPTION OF RELATED ART

Wireless communication devices are widely used, and have become an essential aspect of modern life. Wireless communication devices such as pagers, mobile phones, text pagers, PDA's (personal data assistants) are used for work, for personal activities, and as a way to keep in contact with family and friends. Often, these devices are used to enable voice communications. Increasingly, however, these devices are used to share data messages without initiating a voice communication. These data messages may be, for example, text messages, image files, video files, audio files. As the functionality of these devices increases, their use and acceptance continues to expand. Further, users have become more reliant upon their wireless appliances, and therefore demand high quality service and performance with minimal interruption.

In the current competitive market for wireless devices, a company's reputation and brand is mostly determined by the quality of its products. Users have an expectation that devices will operate without interruption, and if a device fails or otherwise has a defect, that the defect will be promptly and efficiently fixed. Currently, if a user's wireless device malfunctions, the user will typically call, e-mail, or otherwise contact a central support service. The support staff will discuss the defect with the user, and interrogate the user as to operational conditions when the device failed. For example, the support staff may ask the user what he or she was doing as the device failed. More particularly, the support staff may ask the user to remember the series of keystrokes or other commands the user input to the device just prior to the failure. In a similar way, the support staff may ask the user to remember what was presented on the device's display, and the status of any indicator lamps. Unfortunately, the user's memory may not be particularly accurate, and the user may be frustrated by the inability to fully describe the operational condition.

The support staff may also ask the user to input special codes into the device. These codes may cause the wireless device to display more detailed information as to the device's status at the time of failure. Often, a series of numbers or messages is presented to the user, and the user must relay these numbers or codes to the support staff. These numbers and codes often indicate what the general status of the device's processor at the time of failure. Inputting these codes, reading the displays, and working with the support staff may take considerable time and effort for the user. After the support staff has collected the relevant information from the user, the support staff disconnects from the user.

The support staff, with the information regarding user interactions and the processor status, may then begin the process of identifying and fixing the failure. To identify the defect, the support staff often attempts to reproduce the defect in a laboratory environment using the device or simulation equipment. Since the information received from the user is likely inaccurate or incomplete, the support staff must make assumptions as to what the user was doing and how the processor was operating. Accordingly, it may take considerable time to reproduce the failure, and, sometimes, the failure discovered is not even the failure reported by the user. In this case, fixing the discovered bug will not fix the user's reported problem. The support staff typically expands considerable time and resource to correctly identify the root cause of reported failures. Once the root cause has been identified, support staff may proceed in an orderly fashion to generate a repair file to fix the error. After the repair file has proceeded through normal quality assurance channels, the repair file may be loaded onto the user's device. In this regard, the repair file may be downloaded to the user through an over-the-air repair process, or the user may be notified to bring the device to a support center for physical connection to a support cradle.

Unfortunately, the known processes for fixing failures on wireless devices lead to unsatisfactory user experiences. For example, users must initiate the error reporting process, and it is their responsible for remembering keystrokes and display content in order to report interaction information to the support staff. This process can be both time-consuming and frustrating for the users, as well as the support staff. Further, after the users have reported the failure to support center, they often must call back to the support center to find the status of the error, or must go to a central web site to search for status information. If a device fails too often, or if users are dissatisfied with the time and effort it takes to correct a failure, it is likely those users will purchase their next wireless device from a different provider. Therefore providers of wireless devices have a need for an improved system and method for detecting, reporting, and repairing failures in the wireless devices.

SUMMARY

A system and method for detecting, reporting, and repairing software defects in a wireless device are disclosed. The system has a wireless subscriber unit for communicating to a support server. The wireless subscriber unit maintains an action file or list indicative of the historical operation of the wireless subscriber unit. When the wireless subscriber unit detects a local defect or error, the action file is transmitted to the support server. The action file is used by support staff to identify and fix the error, and to prepare a repaired software file. The repaired software file is received at the wireless subscriber unit, and the user is notified that the defect has been fixed. Also, the wireless subscriber unit may receive status updates from the central server to inform the user of repair progress.

In a particular example, a mobile wireless handset maintains an action file or list including user interactions and processor executions. For example, the user interactions may include a list of commands or keystrokes input to the device by the user, and may include a list of information displayed or otherwise presented to the user. The processor executions may include information regarding software execution processes, as well as network-level messages. The mobile handset has a defect detector for detecting when a software or hardware error occurs. After a defect is detected, the action file is locked and then transmitted to the central server. The mobile handset maintains a defect list for reporting defect status to the user. The defect list may be updated from the central server, thereby keeping the user informed regarding repair status. After the defect has been repaired, a software repair file is received and activated, and the user is informed that the defect has been repaired.

Advantageously, the system enables the wireless subscriber unit to collect and report accurate and detailed information for use by support staff. In this way, support staff may more efficiently and effectively identify and fix an error. Further, the system enables timely and correct communication between the user and support staff, thereby increasing user satisfaction.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

Figure 1:
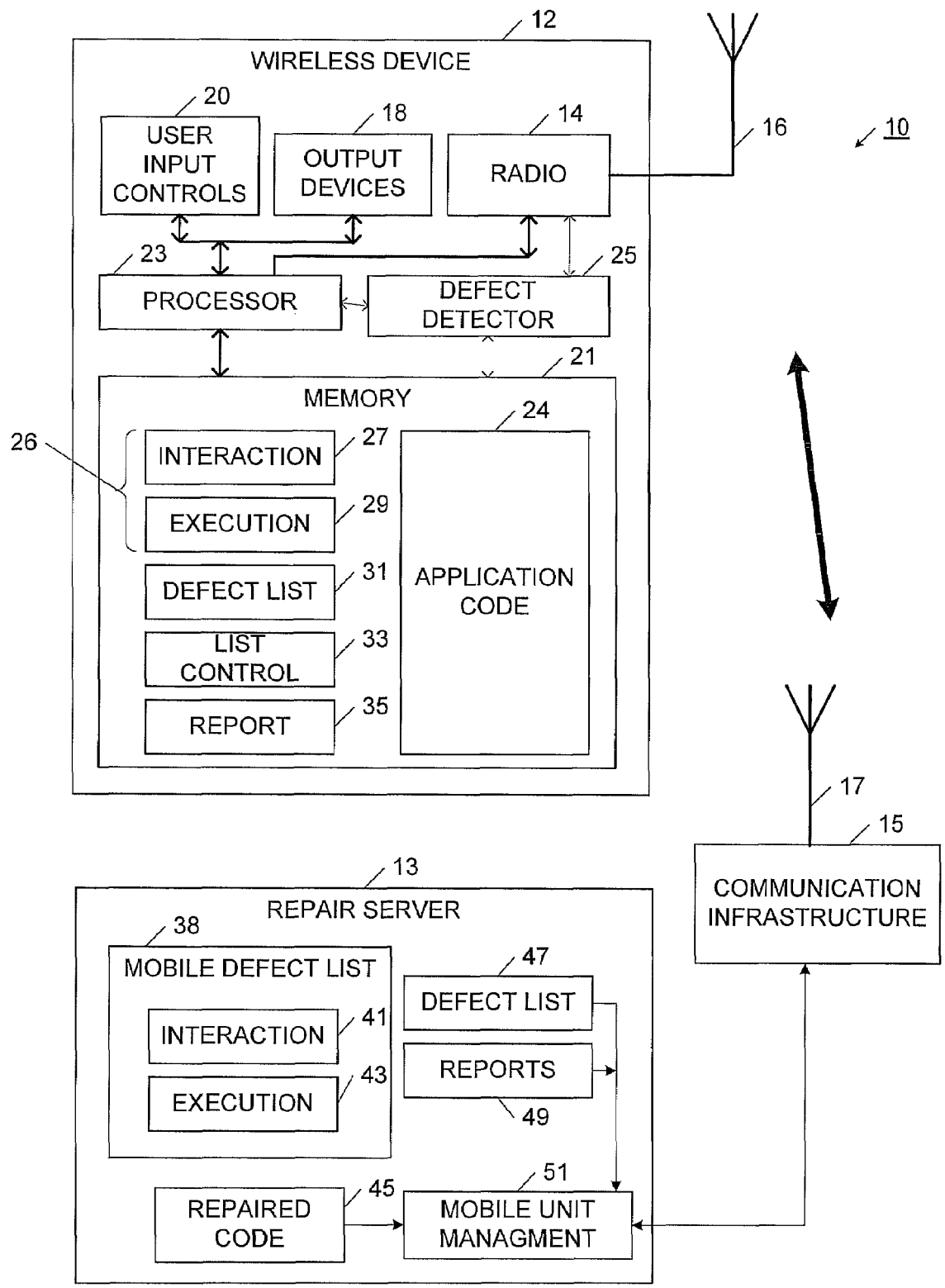
FIG. 1 is a block diagram of a system for detecting, reporting, and repairing software defects in accordance with the present invention.

Referring now to FIG. 1 a system for detecting, reporting, and repairing software defects for a wireless device is illustrated. System 10 has wireless device 12 configured to communicate with repair server 13. Wireless device 12 may be, for example, a wireless handset, a wireless personal data assistant, or other mobile wireless device. It will be appreciated that wireless device 12 may be a discrete device, or may be integrated into another device. For example, wireless device 12 may be a mobile module operating in a vehicle, or it may be integral to a meter monitoring assembly. Wireless device 12 may operate according to international communication standards such as CDMA, WCDMA, UMTS, GSM, EDGE, PHS, or other existing or evolving communication standard. It will also be appreciated that wireless device 12 may operate according to data transfer standards such as Bluetooth®, IEEE 802.11, WiMax, or other proprietary transfer or data standard. Also, wireless device 12 may operate according to a traditional cellular arrangement, a peer to peer arrangement, or a mesh network.

Wireless device 12 accumulates action file 26 of user interactions 27 and device executions 29. Action filed 26 provides a comprehensive record of device operation. Then, after the occurrence of a defect or other error, action file 26 may be transmitted to repair server 13. Support staff at repair server 13 then use action file 26 to more efficiently find and fix the error. Further, wireless device 12 has list control functions 33 and report functions 35 for enabling status communications regarding the error. In this way, the user may receive updated status reports regarding error reporting, repair progress, and fix status. Advantageously, wireless device 12 enables more efficient finding and fixing of errors, as well as increased user satisfaction due to update reports.

Wireless device 12 has radio 14 and antenna structure 16 for wirelessly transmitting and receiving messages. These messages may be, for example, voice messages, data messages, or network messages. In this regard, the base station or other wireless infrastructure may continually send network messages to wireless device 12, and wireless device 12 may respond with status or other messages. The number, content, and frequency of these messages is according to the relevant operating communication standard. Repair server 13 also communicates with communication infrastructure 15. Communication infrastructure may include computer networks, wireless base stations, and antennas, such as antenna 17. Communication infrastructure 15 and antenna 17 cooperate with radio 14 and antenna 16 in establishing a communication link.

Wireless device 12 includes output devices 18 for presenting and communicating to a user. For example, output devices 18 may include a color or monochrome display, a speaker, lamps, vibrator, or other output device. Wireless device 12 also has user input controls 20. Typical user input controls 20 may include navigation keys, keypads, rotary knobs, stylus, or voice command. Wireless device 12 typically has processor 23 for controlling the device's operation. In this regard, processor 23 may perform traditional telephony call processing functions, as well as data management functions. It will be appreciated that processor 23 may be a single device, or functionality may be distributed among two or more processing devices. Processor 23 has associated memory 21 for operating processes and storing data. It will be appreciated that memory 21 may be a cache memory, a random access memory, or a ROM memory. It will also be understood that memory 21 may include fixed or removable memory, and memory 21 may be provided as one or more discrete blocks.

Processor 21 operates software processes for managing calls, data, and user interaction. In particular, processor 23 may operate a software process such as software process 24. Application code 24 may be for example, executable object code, source code, or firmware in reprogrammable memory. Reprogrammable memory may be, for example firmware in the form of EEPROM or flash memory. During operation, wireless device 12 may encounter an operational error. The operational error may be due to a defect in application code 24, or are due to a failed interaction between processor 23 and any of its connected devices. Further, the operational error may be due to a failed telephony function, a failed data function, or a failed application process. It will also be appreciated that some errors may cause wireless device 12 to fully fail or reset, while other less catastrophic errors may be recovered from with little or no user awareness. Often, these less catastrophic errors provide a precursor to more critical or fatal errors. Wireless device 12 includes defect detector 25 for detecting operational errors. Defect detector 25 may be integrated with processor 23, or it may be discrete. It will also be appreciated that defect detector 25 may be a single detector, or maybe a series of independent or interconnected detectors.

During operation, and prior to an error detection, the processor is collecting and storing a list of actions performed at wireless device 12. This list of actions provides a historical record of the operational condition of wireless device 12. The list of actions may be stored in action file 26. In one example, action file 26 is a first-in-first-out memory. In this way, the newer actions continually replace the oldest actions in the memory. The size of action list 26 may be adjusted according to available memory and wireless device 12. Further, the level of detail stored may be adjusted according to available memory. Action list 26 includes interaction actions 27, and processor execution actions 29. Interaction actions 27 may include a list of commands made by the user. These commands may be, for example, keypad commands, navigation key commands, other key commands, voice commands, stylus commands, or any other input made by the user to user input controls 20. Interaction actions 27 may also include presentations made to the user on output devices 18. For example, interaction action 27 may include content of items displayed to the user, sounds played by a speaker, menus displayed, or error messages. In this way, interaction file 27 includes a historical record of the interaction between wireless device 12 and the user.

Action file 26 may also include execution list 29. Execution list 29 may include a software execution description. The level of detail in the software execution description may be adjusted according to specific application needs, and by available memory. For example some applications may require a high degree of granularity to the execution description. Other applications may be adequately defined with less data. A software execution description may include information about memory stacks, function calls, methods performed, procedure calls, variable values, address calls, register information, and flag settings. The execution description may also include message content, timing information, and internal error conditions. Execution list 29 may also include network messages. For example, many communication standards include forward and reverse network messaging for communicating network status. Capturing and storing these messages may assist in understanding the full condition of wireless device 12. Action file 26 may also include time information. The time information may be generated locally or may be derived from one or more network messages.

In operation, wireless device 12 operates application 24, and action files 26 are continually populated with information regarding the device's operation. When defect detector 25 detects and error condition, defect detector 25 causes action file 26 to be locked. In this way, no new actions are recorded into action file 26, and no older actions are lost. It will be appreciated that the locking of action file 26 may be done be a time after the error was detected. In this way, a historical record of how wireless device 12 reacted to the error may be captured. It will also be appreciated that the amount of time allowed for capturing post-error events may be adjusted according to specific applications, amount of available memory, or type of error found. Defect detector 25 also attaches an identifier to the error and places the error in defect list 31. Defect list 31 thereby includes a list of the errors detected at wireless device 12. Further, action file 26 is transmitted to repair server 13 along with the identifier used in defect list of 31. This transfer may occur shortly after the error was found, or, may be done at a later time. For example, if the error caused wireless device 12 to become unstable or reset, then the transfer of action file 26 may occur when the phone is next activated.

Action list 26 is received at repair server 13 and At mobile unit management system 51. Mobile unit management 51 identifies the particular wireless device having sent the action file, and passes the action file to mobile defect list 38. Mobile defect list 38 may contain action files received from many wireless devices. As repair server 13 receives action files from various wireless devices, a set of user interaction files 41 may be accumulated, as well as a set of execution action files 43. Support staff may advantageously use interaction files 41 and execution files 43 to more quickly and efficiently identify and repair software process errors. Repair server 13 also maintains a defect list 47. Defect list 47 may assist support personnel in prioritizing defects, and may be useful to track the progress on repairing outstanding errors.

During the debugging and repair process, support staff may desire to communicate status to users experiencing a particular error. In this regard, repair server 13 has report function 49. A support engineer, for example, may prepare a report that a particular error is scheduled for repair in two days, and may desire that users who have experienced this error are made aware that a fix will arrive shortly. The support engineer prepares the report, and mobile unit management function 51 cooperates with defect list 47 to determine which particular wireless devices have reported that particular error. The report is then communicated through communication infrastructure 15 to all the wireless devices that have previously reported that error. The report is received into the wireless device, such as wireless device 12. The report is received by list control 33, which updates the internal defect list 31 to indicate a repair is forthcoming. In this way, if the same error were to occur on wireless device 12 again, defect list 31 could restrict the transmission of action file 26, because a fix has already been identified. The list control also generates local report 35. Local report 35 may be presented to the user, so the user knows the current status of an error.

When the support engineering has generated repaired code 45, that repaired code 45 is transmitted to the wireless devices having reported the error. In another example, the repaired code may be sent to all wireless devices in that class, so that those devices do not experience the error. The repaired code is received at the wireless device, such as wireless device 12. The repaired code is substituted for application code 24, and wireless device 12 may now operate without experiencing the error. The repaired code also is used to update defect list 31 by removing the defect from the outstanding error list. List control 33 also generates local user report 35, reporting to the user that the error has now been fixed.

Figure 2:
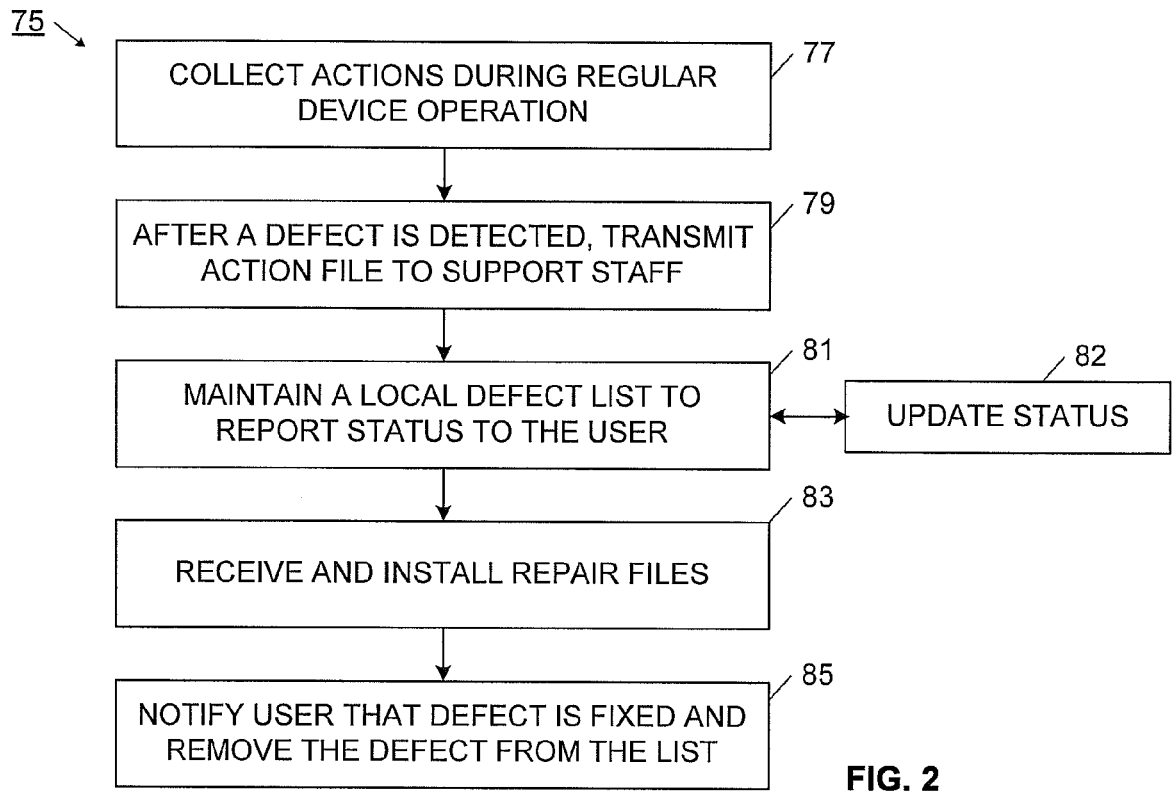
FIG. 2 is a flowchart of a process for managing software defects on a wireless subscriber unit in accordance with the present invention.

Referring now to FIG. 2, a method for managing software defects on a wireless subscriber unit is illustrated. In method 75, the wireless subscriber unit collects actions during the regular device operation as shown in block 77. These actions may include user interactions and processor execution actions. For example, user interactions may include user input commands and user presentation information. The processor executions may include software execution information, as well as network message information. After the defect is detected, the action file is transmitted to software support staff as shown in block 79. It will be appreciated that the action file may be transmitted immediately after the defect is found, or may be sent at a later time. The wireless subscriber unit maintains a local defect list as shown in block 81. The local defect list is used to report status to the user of the wireless subscriber device. For example, the user may be notified that the action file has been successfully transmitted and that support engineering is working on the problem. Also, if the same error were to occur again, the local defect list may report to the user that the error has already been reported, and the restrict the action file from being sent. Update 82 may be received from the support staff. Such an update may come in the form of a network message, or an SMS message. The update status is used to update the local defect list, and to report the status of the error to the user. For example, the update may report that the error has been fixed, and that a new software update will shortly be delivered. After the software support staff has prepared a repair support file, that repair file is received and installed as shown in block 83. After the new repair file has been installed, the user may be notified that the defect has been fixed and removed the defect from the defect list as shown in block 85.

Figure 3:
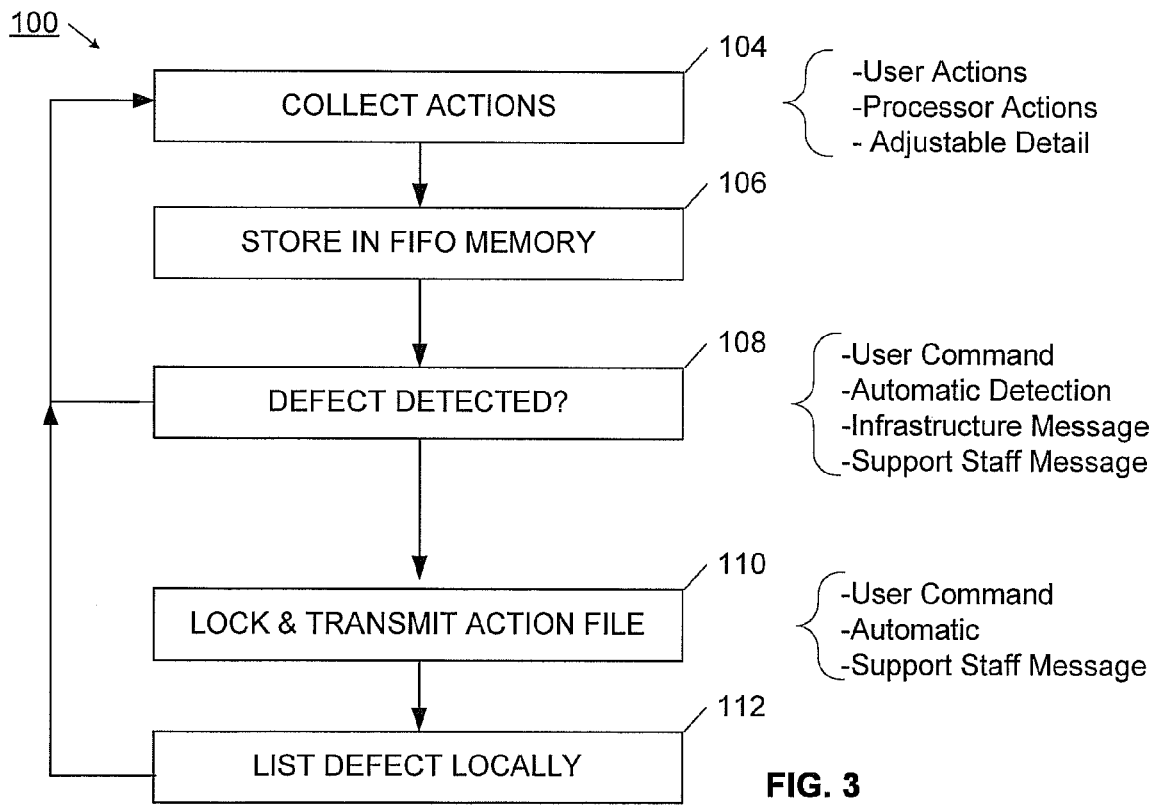
FIG. 3 is a flowchart of a process for detecting and reporting software defects on a wireless subscriber unit in accordance with the present invention.

Referring now to FIG. 3, a method for detecting and reporting software defects on a wireless subscriber unit is illustrated. Method 100 collects actions as shown in block 104. These actions may include user interactions, processor actions, and network message information. It will be appreciated that the level of detail collected may be adjusted according to application specific needs or memory availability. These actions are recorded in a first-in-first-out memory as shown in block 106. In this way, new actions replace the oldest actions in memory. The wireless devices then monitors for a defect as shown in block 108. A defect may be identified locally using defect detection circuitry, or may be responsive to a processor error. The defect may also be detected by a user command. For example, the user may provide a particular code or function, and force the wireless device to lock and transmit the action file to the support staff. In another example, the wireless device may receive a message to initiate error processing. In this way, the support staff may initiate a message to the wireless device to transmit the action file to the support staff. This can be particularly useful, for example, when the user is on the wireless device communicating with the support staff. When the support staff sees a particular condition occur on the network, the support staff may send a message for the wireless device to stop capturing the action items, and transmit the action item file to the support staff.

As shown in process 110, the action file is locked and then transmitted to the support staff. As discussed above, the locking and transmitting may be done responsive to a user command, automatically by the wireless device, or according to a support staff message. Finally, the defect or error is listed locally as shown in block 112. In this way, a report may be generated for the user indicating that the error or defect has been reported to support staff. Also, by maintaining a defect list locally, if another similar defect is detected, then the wireless device may restrict sending the action file, and report to the user that the error has already been reported to central support.

Figure 4:
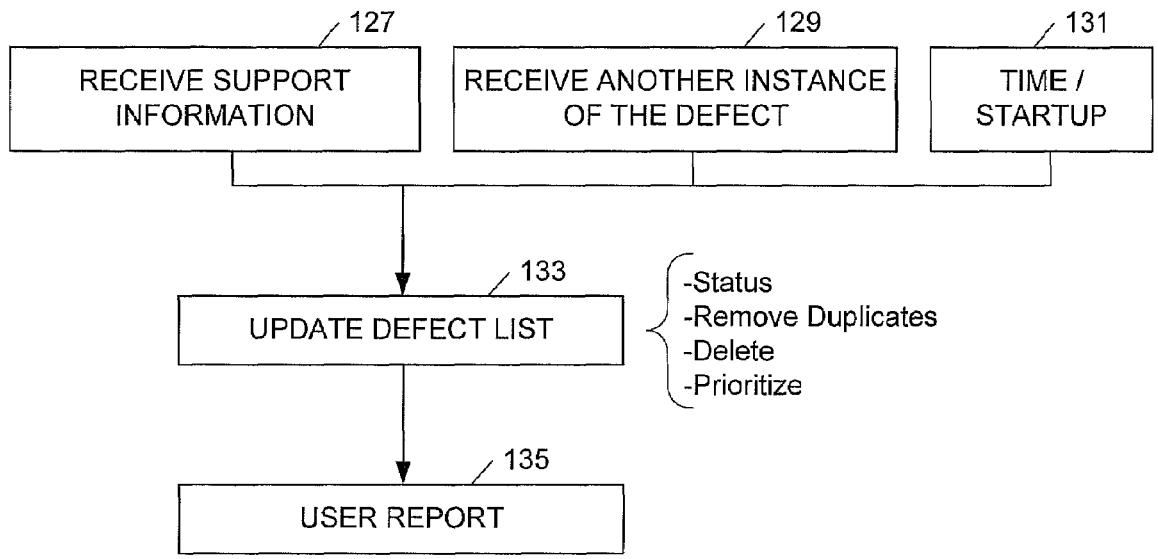
FIG. 4 is a flowchart of a process for updating and reporting software defects on a wireless subscriber unit in accordance with the present invention.

Referring now to FIG. 4, a process for updating and reporting software defects on a wireless subscriber unit is illustrated. Method 125 operates on a wireless subscriber device that has a defect list. The defect list identifies errors that have been reported to a software support center. Upon receiving support information as shown in block 127, the device may update the local defect list as shown in block 133. In another example, the wireless device may locally detect another instance of the defect, and report that defect to the defect list. Finally, the local wireless device may periodically or occasionally report error status to the user. The reports may be made at a particular time or time interval, or may be done each time the phone initializes as shown in block 131. The defect list may be updated to contain the current status of the error, remove duplicates, delete repaired defects, or arrange the defects according to a priority. The wireless device made then generate a report from the defect list to update the user on the status of reported errors and shown in block 135.

Figure 5:
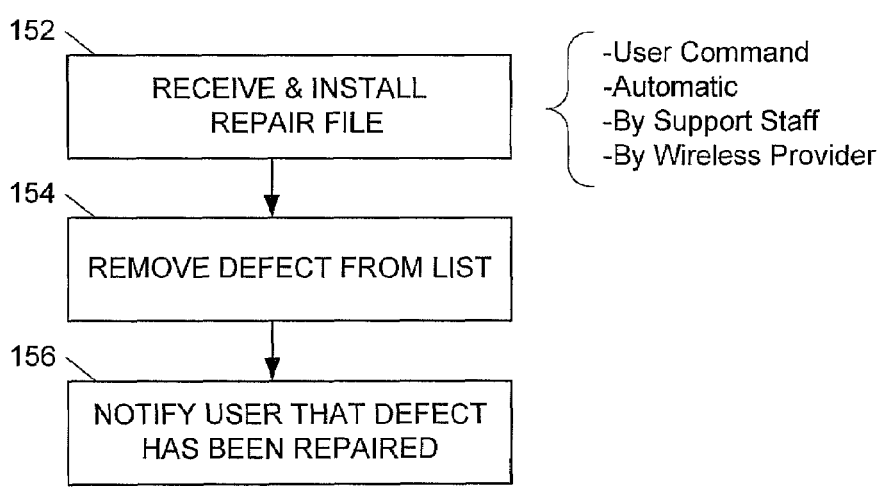
FIG. 5 is a flowchart of a process for repairing software defects on a wireless subscriber unit in accordance with the present invention.

Referring now to FIG. 5 a method for repairing software defects on a wireless subscriber unit is illustrated. Method 150 has a wireless subscriber unit that receives and installs a repair file as shown about 152. The repair file was generated by a support staff and wirelessly transmitted to the wireless subscriber unit. The timing for transmitting the repair file may be by a user command, may be automatic, may be done responsive to a support staff instruction, or may be set by a wireless provider. Once the repair file has been received and installed, the repaired error is removed from the defect list as shown in block 154. Further, the user is notified that the defect has been repaired as shown in block 156.

Figure 6:
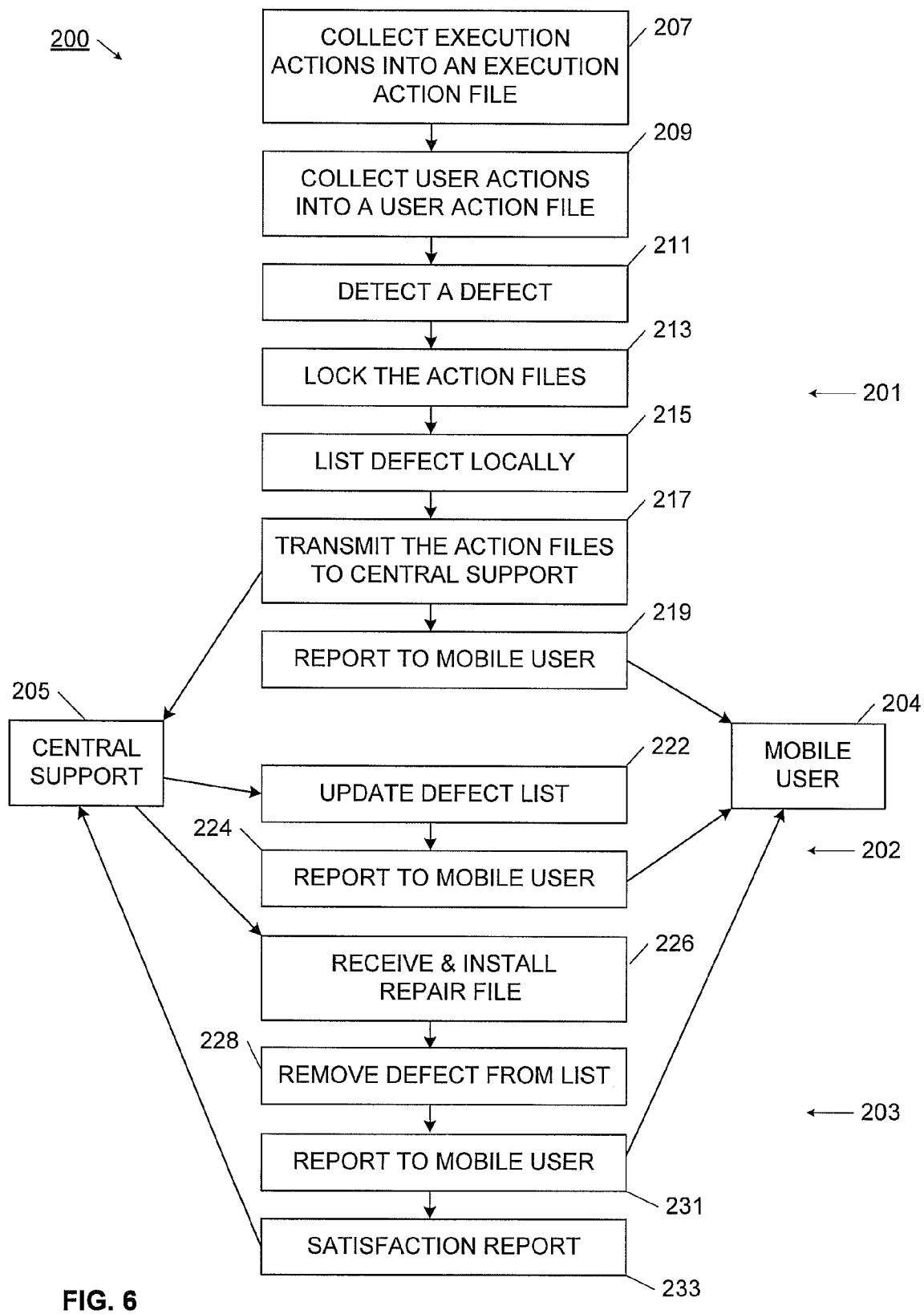
FIG. 6 is a flowchart of a process for detecting, reporting, and repairing software defects in accordance with the present invention.

Referring now to FIG. 6, a method for detecting, reporting, and repairing software defects is illustrated. Method 200 has detecting and reporting function 201, updating function 202, and repair function 203. Detecting and recording function 201 has a wireless subscriber unit that collects actions into an action file. More particularly, the wireless subscriber unit collects execution actions into an execution action file as shown in block 207. These execution actions may include specific software operational information, such as branching and address information, and may also include network message information. The action file also may collect user actions as shown in block 209. These user actions may include commands given by the user to the wireless subscriber unit, and information presented to the user by the wireless subscriber unit. The wireless subscriber unit operates to collect the action file on a first-in-first-out basis. In this way, the action file represents the recent historical record of the overall operational condition of the wireless subscriber unit. During operation, a defect may be detected as shown in block 211. The defect may be, for example, an error in software or hardware operation, or may be a message received from the user, the support staff, or the network. Once a defect has been detected, the action file may be locked as shown in block 213. It will be appreciated that the action file may continue to collect action items for a period of time after the defect is detected, thereby capturing a record of how the wireless subscriber unit reacted to the error. The wireless subscriber unit identifies the error and places the error into a local list as shown in block 215. The action file is then transmitted to central support as shown in block 217. The transmission may occur soon after the defect was detected, or may be done at a later time. In block 219, the wireless subscriber reports to the user 204 that an error has been detected and that information has been passed to central support 205. It will be appreciated that a report may not be made if the error was relatively minor and could be recovered from without user awareness.

Central support 205 then uses the action files from this and other wireless devices to more effectively and efficiently find and fix the error. While central support is working towards a fix, it may be desirable to report an update status to the user. Accordingly, central support may send a message to the wireless device, for example through network messaging or an SMS message, to update defect list 222. When local defect list 222 is updated, a report may be made to the user indicating the updated status as shown in block 224. In this way, mobile user 204 may be continually updated on error status. Update function 202 may advantageously assist in overall customer satisfaction, and relieve a customer's tension as to when an error will be fixed. After central support 205 identifies and fixes the error, central support generates a repair file. The repair file is received and installed at the wireless subscriber unit as shown in block 226. When the defect has been repaired, the defect may be removed from the list as shown in block 228. The mobile user may receive a report that the error has been successfully fixed as shown in block 231. Optionally, the user may be asked to complete a satisfaction report to assure that the user is satisfied with the repair as shown in block 233.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:
1. A wireless subscriber unit, comprising:
an action file holding a list of actions performed by the wireless subscriber unit;

a processor operating an application;

a defect detector arranged to detect an error in the operation of the application;

a defect list maintaining a list of defects detected by the defect detector; and a first-in-first-out (FIFO) memory that stores the action file, wherein the size of the FIFO memory is adjusted according to available memory of the wireless subscriber unit;

wherein collecting action items on the FIFO memory and for a period of time after the error has been detected to generate a record of how the wireless subscriber unit reacted to the error;

wherein the action file is transmitted responsive to generating the record of how the wireless subscriber unit reacted to the error;

a repaired software file that is received and installed on the wireless subscriber unit;

an output device that presents a current status for the error, wherein the output device indicates the error has been repaired.

2. The wireless subscriber unit according to claim 1, further comprising a key-stroke detector for detecting user interactions, the key-stroke detector generating user action items that are transferred to the action file.

3. The wireless subscriber unit according to claim 1, further comprising an output-display detector for detecting user interactions, the output-display detector generating user action items that are transferred to the action file.

4. The wireless subscriber unit according to claim 1, further comprising a processor-execution detector for detecting processor actions, the processor-execution detector generating processor action items that are transferred to the action file.

5. A wireless subscriber unit, comprising:
   a radio system;
     user input keys;
     an output device;
     a processor, the processor executing a software process; and
     the wireless subscriber unit operating the steps of:
       maintaining an action list indicative of the historical operation of the wireless subscriber unit;
       storing the action list according to a first-in-first-out (FIFO) memory, wherein the size of the FIFO memory is adjusted according to the available memory for the wireless subscriber unit;
       detecting an error has occurred during execution of the software process;
       collecting action items on the FIFO memory and for a period of time after the error has been detected to generate a record of how the wireless subscriber unit reacted to the error;
       transmitting the action list responsive to generating the record of how the wireless subscriber unit reacted to the error;
       presenting to the user a current status for the error;
       presenting the current status;
       receiving and installing a repaired software file; and
       presenting on the output device that the error has been repaired.

6. The wireless subscriber unit according to claim 5, wherein the step of maintaining an action list further comprises storing a sequence of commands received from a user.

7. The wireless subscriber unit according to claim 5, wherein the step of maintaining an action list further comprises storing a sequence of input-key strokes made by a user.

8. The wireless subscriber unit according to claim 5, wherein the step of maintaining an action list further comprises storing a sequence of operations performed by the processor.

9. The wireless subscriber unit according to claim 5, wherein the step of maintaining an action list further comprises storing a sequence of display items presented to a user.

10. The wireless subscriber unit according to claim 5, wherein the step of maintaining an action list further comprises storing a sequence of received network messages.

11. The wireless subscriber unit according to claim 5, wherein the wireless subscriber unit further operates the steps of:
   receiving an update on the error status; and
   presenting the update information on the output device.

12. The wireless subscriber unit according to claim 5, wherein the step of maintaining an action list further comprises storing:
   a sequence of commands received from a user; and
   a sequence of input-key strokes made by a user.

13. The wireless subscriber unit according to claim 5, wherein the step of presenting the current status is done responsive to receiving a wireless message having a status update.

14. The wireless subscriber unit according to claim 5, wherein the step of presenting the current status is done responsive to a user request.

15. The wireless subscriber unit according to claim 5, wherein the step of maintaining an action list further comprises:
   receiving a message to store action items into the action list; and
   storing, responsive to receiving the message, the action items.

16. The wireless subscriber unit according to claim 15, wherein the message is generated locally at the wireless subscriber unit.

17. The wireless subscriber unit according to claim 15, wherein the message is a wireless message.

18. A method for repairing a software process, comprising:
   maintaining an action list indicative of the historical operation of a wireless subscriber unit;
   detecting an error has occurred during execution of the software process;
   collecting action items on the FIFO memory and for a period of time after the error has been detected to generate a record of how the wireless subscriber unit reacted to the error;
   transmitting the action list responsive to generating the record of how the wireless subscriber unit reacted to the error;
   receiving the action file from the wireless subscriber unit;
   using the action file to locate and fix an error in the software process;
   generating a repaired software file;
   transmitting the repaired software file to the wireless subscriber unit,
   presenting to the user a current status for the error on the wireless subscriber unit;
   presenting the current status; and
   notifying the user that the error has been repaired.

19. The method according to claim 18, wherein the action file includes a sequence of commands made by a user of the wireless subscriber unit.

20. The method according to claim 18, wherein the action file includes a sequence of input-key strokes made by a user of the wireless subscriber unit.

21. The method according to claim 18, wherein the action file includes a sequence of operations performed by the processor.

22. The method according to claim 18, wherein the action file includes a sequence of received network messages.

23. The method according to claim 18, further including the steps of:

generating a message indicative of the repair status for the error; and transmitting the message to the wireless subscriber unit.

24. The method according to claim 18, further including the steps of:

receiving a request message from the wireless subscriber unit regarding status of the error;

generating a status message indicative of the repair status for the error; and transmitting the status message to the wireless subscriber unit.

25. The method according to claim 18, further including the step of transmitting a message instructing a wireless subscriber unit to collect action items.

* * * * *